(12) United States Patent
Schoenblum et al.

(10) Patent No.: US 6,418,122 B1
(45) Date of Patent: Jul. 9, 2002

(54) METHOD AND APPARATUS FOR ASSURING SUFFICIENT BANDWIDTH OF A STATISTICAL MULTIPLEXER

(75) Inventors: Joel W. Schoenblum, Roswell; Si Jun Huang, Suwanee, both of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/240,344

(22) Filed: Jan. 29, 1999

Related U.S. Application Data

(63) Continuation-in-part of application No. 08/823,007, filed on Mar. 21, 1997, now Pat. No. 6,052,384.

(51) Int. Cl.[7] .................................................. H04J 3/14
(52) U.S. Cl. ....................................... 370/252; 370/231
(58) Field of Search ................................ 370/468, 537, 370/538, 470, 539, 252

(56) References Cited

U.S. PATENT DOCUMENTS

| | | | | |
|---|---|---|---|---|
| 5,115,309 A | * | 5/1992 | Hang | 358/133 |
| 5,159,447 A | * | 10/1992 | Haskell et al. | 358/133 |
| 5,301,187 A | * | 4/1994 | Reum | 370/24 |
| 5,381,413 A | * | 1/1995 | Tobagi et al. | 370/85.6 |
| 5,463,620 A | * | 10/1995 | Sriram | 370/60 |
| 5,506,844 A | * | 4/1996 | Rao | 370/84 |
| 5,757,801 A | * | 5/1998 | Arimilli | 370/444 |
| 5,854,658 A | | 12/1998 | Uz et al. | |
| 5,901,149 A | * | 5/1999 | Itakura et al. | 370/468 |
| 6,052,384 A | * | 4/2000 | Huang et al. | 370/468 |
| 6,219,358 B1 | * | 4/2001 | Pinder et al. | 370/537 |

FOREIGN PATENT DOCUMENTS

| | | |
|---|---|---|
| WO | WO 97/19559 | 5/1997 |
| WO | WO 98/16067 | 4/1998 |
| WO | WO 98/43376 | 10/1998 |

* cited by examiner

*Primary Examiner*—Alpus H. Hsu
*Assistant Examiner*—Toan D. Nguyen
(74) *Attorney, Agent, or Firm*—Kenneth M. Massaroni; Kelly A. Gardner; Hubert J. Barnhardt, III

(57) ABSTRACT

Techniques for determining an output rate for a bit stream, the output rate being determined by applying information read from the bit stream to available bandwidths. The techniques are employed to construct a statistical multiplexer that multiplexes varying bit-rate bit streams onto a satellite up-link. Minimum and maximum output rates for each bit stream are determined such that neither a queue for the bit stream in the multiplexer nor the bit stream's decoder will underflow or overflow. The multiplexer looks at the fullness of the memory buffers and correlates the fullness with the likelihood of a condition in which output will exceed bandwidth. If there is not enough bandwidth to give every bit stream its minimum rate, glue frames may be inserted, or low priority channels dropped.

18 Claims, 5 Drawing Sheets

METHOD AND APPARATUS FOR ASSURING SUFFICIENT BANDWIDTH OF A STATISTICAL MULTIPLEXER

CROSS REFERENCE TO RELATED APPLICATIONS

This application is a continuation in part application of pending U.S. application Ser. No. 08/823,007, filed Mar. 21, 1997, by Huang, et al, entitled "Using a Receiver Model to Multiplex Variable-Rate Bit Streams Having Timing Constraints," and assigned to Scientific-Atlanta, Inc. now U.S. Pat No. 6,052,384.

FIELD OF THE INVENTION

The invention relates in general to the transmission of variable-rate bit streams and more particularly to detecting and preventing imminent bandwidth overflow.

BACKGROUND OF THE INVENTION

A new problem in data transmission is the transmission of data that requires a high bandwidth, is bursty, and has temporal constraints. Traditionally, data transmission has been done on the public switched networks provided by the telephone companies or on packet networks. The public switched networks are designed for interactive voice applications and so provide relatively low-bandwidth circuits that satisfy stringent temporal constraints. The packet networks are designed for the transfer of data between computer systems. The only constraint is that the data eventually arrive at its destination. The amount of bandwidth available for a transfer depends on the degree of congestion in the network. The packet networks thus typically make no guarantees about when or even in what order the data in a burst of data will arrive at its destination.

It may thus be appreciated that neither the telephone network nor the packet network is well-adapted to handle high-bandwidth, bursty data with time constraints. An example of such data is digital television which has been compressed according to the Motion Picture Experts Group ("MPEG") MPEG-2 standard, otherwise set forth in ISO/IEC 13818-1 and 13818-2.

Referring now to FIG. 1 there is illustrated therein those details of the MPEG-2 standard that are required for an understanding of the present invention. The MPEG-2 standard defines an encoding scheme for compressing digital representations of video. The encoding scheme takes advantage of the fact that video images generally have large amounts of spatial and temporal redundancy. There is spatial redundancy because a given video picture has sections where the entire area has the same appearance; the larger the areas and the more of them there are, the greater amount of spatial redundancy in the image. There is temporal redundancy because there is often not much change between a given video image and the ones that precede and follow it in a sequence. The less the amount of change between two video images, the greater the amount of temporal redundancy. The more spatial redundancy there is in an image and the more temporal redundancy there is in the sequence of images to which the image belongs, the fewer the bits of information that will be needed to represent the image.

Maximum advantage for the transmission of images encoded using the MPEG-2 standard is obtained if the images can be transmitted at variable bit rates. The bit rates can vary because the rate at which a receiving device receives images is constant, while the images have a varying number of bits. A large image therefore requires a higher bit rate than a small image, and a sequence of MPEG images transmitted at variable bit rates is a variable-rate bit stream with time constraints. For example, a sequence of images that shows a news anchorperson in front of a solid color background will have much more spatial and temporal redundancy than a sequence of images for a commercial or MTV song presentation, and the bit rate for the images showing the news anchor will be far lower than the bit rate for the images of the MTV song presentation.

The MPEG-2 compression scheme presents a sequence of video images as a sequence of compressed pictures, each of which must be decoded at a specific time. There are three ways in which pictures may be compressed. One way is intra-coding, in which the compression is done without reference to any other picture. This encoding technique reduces spatial redundancy but not time redundancy, and the pictures resulting from it are generally larger than those in which the encoding reduces both spatial redundancy and temporal redundancy. Pictures encoded in this way are called I-pictures. A certain number of I-pictures are required in a sequence, first, because the initial picture of a sequence is necessarily an I-picture, and second, because I-pictures permit recovery from transmission errors.

Time redundancy is reduced by encoding pictures as a set of changes from earlier or later pictures or both. In MPEG-2, this is done using motion compensated forward and backward predictions. When a picture uses only forward motion compensated prediction, it is called a Predictive-coded picture, or P picture. When a picture uses both forward and backward motion compensated predictions, it is called a bi-directional predictive-coded picture, or a B picture for short. P pictures generally have fewer bits than I-pictures and B pictures have the smallest number of bits. The number of bits required to encode a given sequence of pictures in MPEG-2 format is thus dependent on the distribution of picture coding types mentioned above, as well as the picture content itself. As will be apparent from the foregoing discussion, the sequence of pictures required to encode the images of the news anchorperson will have fewer and smaller I-pictures and smaller B and P pictures than the sequence required for the MTV song presentation, and consequently, the MPEG-2 representation of the images of the news anchorperson will be much smaller than the MPEG-2 representation of the images of the MTV sequence.

The MPEG-2 pictures are being received by a low-cost consumer electronics device such as a digital television set or a set-top box provided by a cable television ("CATV") service provider. The low cost of the device strictly limits the amount of memory available to store the MPEG-2 pictures. Moreover, the pictures are being used to produce moving images. The MPEG-2 pictures must consequently arrive in the receiver in the right order and with time intervals between them such that the next MPEG-2 picture is available when needed and there is room in the memory for the picture which is currently being sent. In the art, a memory which has run out of data is said to have underflowed, while a memory which has received more data than it can hold is said to have overflowed. In the case of underflow, the motion in the TV picture must stop until the next MPEG-2 picture arrives, and in the case of overflow, the data which did not fit into memory is simply lost.

FIG. 1 is a representation of a system 10 including digital picture source 12 and a television 14 that are connected by a channel 16 that is carrying a MPEG-2 bit stream representation of a sequence of TV images. The digital picture source 12 generates uncompressed digital representations ("UDR") of images 18, which go to variable bit rate ("VBR") encoder 20. Encoder 20 encodes the uncompressed digital representations to produce a variable rate bit stream ("VRBS") 22. Variable rate bit stream 22 is a sequence of compressed digital pictures 24($a \ldots n$) of variable length. As indicated above, when the encoding is done according to the MPEG-2 standard, the length of a picture depends on the complexity of the image it represents and whether it is an I-picture, a P picture, or a B picture. Additionally, the length of the picture depends on the encoding rate of VBR encoder 20. That rate can be varied. In general, the more bits used to encode a picture, the better the picture quality.

The variable rate bit stream 22 is transferred via channel 16 to VBR decoder 26, which decodes the compressed digital pictures 24($a \ldots n$) to produce uncompressed digital pictures 28. These in turn are provided to television 14. If television 14 is a digital television, they will be provided directly; otherwise, there will be another element which converts uncompressed digital pictures ("UDP") 28 into standard analog television signals and then provides those signals to television 14. There may of course be any number of VBR decoders 26 receiving the output of a single encoder 20.

In FIG. 1, channel 16 transfers bit stream 22 as a sequence of packets 30. The compressed digital pictures 24 thus appear in FIG. 1 as varying-length sequences of packets 30. Thus, picture 24($a$) may have "n" packets while picture 24($n$) has "k" packets. Included in each picture 24 is timing information 32. Timing information contains two kinds of information: clock information and time stamps. Clock information is used to synchronize decoder 26 with encoder 20. The MPEG-2 specification refers to this clock information as the Program Clock Reference (PCR). The time stamps include the Decoding Time Stamp ("DTS") which specifies when a picture is to be decoded and the Presentation Time Stamp ("PTS") which specifies when it is actually to be displayed. The times specified in the time stamps are specified in terms of the clock information. As indicated above, VBR decoder 26 contains a relatively small amount of memory for storing pictures 24 until they are decoded and provided to TV 14. This memory is shown at 34 in FIG. 1 and will be referred to hereinafter as the decoder's bit buffer. Bit buffer 34 must be at least large enough to hold the largest possible MPEG-2 picture. Further, channel 16 must provide the pictures 24 to bit buffer 34 in such fashion that decoder 26 can make them available at the proper times to TV 14 and that bit buffer 34 never overflows or underflows. Bit buffer 34 underflows if not all of the bits in a picture 24 have arrived in bit buffer by the time specified in the picture's time stamp for decoder to begin decoding the picture.

Providing pictures 24 to VBR decoder 26 in the proper order and at the proper times is made more complicated by the fact that a number of channels 16 may share a single very high bandwidth data link. For example, a CATV provider may use a satellite link to provide a large number of TV programs from a central location to a number of CATV network head ends, from which they are transmitted via coaxial or fiber optic cable to individual subscribers or may even use the satellite link to provide the TV programs directly to the subscribers. When a number of channels share a medium such as a satellite link, the medium is said to be multiplexed among the channels.

FIG. 2 shows such a multiplexed medium. A number of channels 16(0) through 16($n$) which are carrying packets containing bits from variable rate bit streams 22 are received in multiplexer 40, which processes the packets as required to multiplex them onto high bandwidth ("HBW") medium 42. The packets then go via medium 42 to demultiplexer 44, which separates the packets into the packet streams for the individual channels 16(0 ... $n$). A simple way of sharing a high bandwidth medium among a number of channels that are carrying digital data is to repeatedly give each individual channel 16 access to the high bandwidth medium for a short period of time, referred to hereinafter as a slot.

One way of doing this is shown at 50 in FIG. 2. The short period of time appears at 50 as a slot 52($n \ldots o$); during a slot such as slot 52($o$) a fixed number of packets 30($n \ldots o$) belonging to a channel 16 may be output to medium 42. Each channel 16 in turn has a slot 52, and all of the slots taken together make up a time slice 54. When medium 42 is carrying channels like channel 16 that have varying bit rates and time constraints, slot 52 for each of the channels 16 must output enough packets to provide bits at the rate necessary to send the largest pictures to channel 16 within channel 16's time, overflow, and underflow constraints. Of course, most of the time, a channel's slot 52 will be outputting fewer packets than the maximum to medium 42, and sometimes may not be carrying any packets at all. Since each slot 52 represents a fixed portion of medium 42's total bandwidth, any time a slot 52 is not full, a part of medium 42's bandwidth is being wasted.

In order to avoid wasting the medium bandwidth, a technique is used which ensures that each time slice is generally almost full of packets. This technique is termed statistical multiplexing. It takes advantage of the fact that at a given moment of time, each of the channels in a set of channels will be carrying bits at a different bit rate, and the medium bandwidth need only be large enough at that moment of time to transmit what the channels are presently carrying, not large enough to transmit what all of the channels could carry if they were transmitting at the maximum rate. The output of the channels is analyzed statistically to determine what the actual maximum rate of output for the entire set of channels will be and the medium bandwidth is sized to satisfy that actual peak rate. Typically, the bandwidth that is determined in this fashion will be far less than is required for multiplexing in the manner shown at 55 in FIG. 2. As a result, more channels can be sent in a given amount of bandwidth. At the level of slots, what statistical multiplexing requires is a mechanism which in effect permits a channel to have a slot in time slice 54 which varies in length to suit the actual needs of channel 16 during that time slice 54. Such a time slice 54 with varying-length slots 56 is shown at 55.

Methods of statistically multiplexing bit streams are disclosed in, for example, U.S. Pat. No. 5,506,844, entitled, *Method for Configuring a Statistical Multiplexer to Dynamically Allocate Communication Channel Bandwidth*, to Rao, issued Apr. 9, 1996; and U.S. patent application Ser. No. 08/823,007 entitled *Using a Receiver Model to Multiplex Variable Rate Bit Streams Having Timing Constraints*, filed Mar. 21, 1997, now U.S. Pat. No. 6,052,384 the disclosures of each of which are incorporated herein by reference.

While the methods of statistically multiplexing bits streams disclosed in the referenced patents and applications all perform in an adequate manner, there are certain limitations that have come to light. For example, while the Rao patent does disclose a way to maximize the degree to which the Medium's bandwidth is used, it has a number of shortcomings, perhaps the most important of which relates to the fact that it adjusts the multiplexing by changing picture quality. A second shortcoming relates to the fact that it teaches encoders that encode digital images as piece-wise constant bit streams. These bit streams have a lower degree of compression than variable-rate bit streams.

The limitations inherent in the '007 application relate to the fact that the high bandwidth medium is of constant bandwidth and therefore statistical multiplexing can only accommodate input channels of limited peak bit rates. Each time slice, each of the channels is allocated a portion of the high bandwith medium output of the multiplexer. Accordingly, the bit rate allocation is essentially static, and cannot respond to changing conditions, such as instantaneous peak bit rate changes from one or more channels. Likewise, in the '007 application the problems associated with overflow are dealt with by replacing non-anchor pictures in the MPEG-2 bit stream (e.g., B picture in an I-B-P sequence, or any I-picture in an all I-picture sequence) with smaller "glue" pictures. While this is an important innovation, it does not alone guarantee the total bandwidth requirements of all channels at a given instant will be less that the available output of the multiplexer (i.e., does not guarantee prevention of a bandwidth overflow condition). Nor does it provide any means of detecting when overflow is imminent, and which pictures in which channels will be effected.

Accordingly, there exists a need for an improved method of handling potential bandwidth overflow situations. Such an improved method should not only improve allocation of bandwidth, but should also better anticipate imminent bandwidth overflow, and the channels likely effected. All this should also be accomplished without compromising overall effectiveness of the multiplexer.

DETAILED DESCRIPTION OF THE PREFERRED EMBODIMENT

Figure 1:
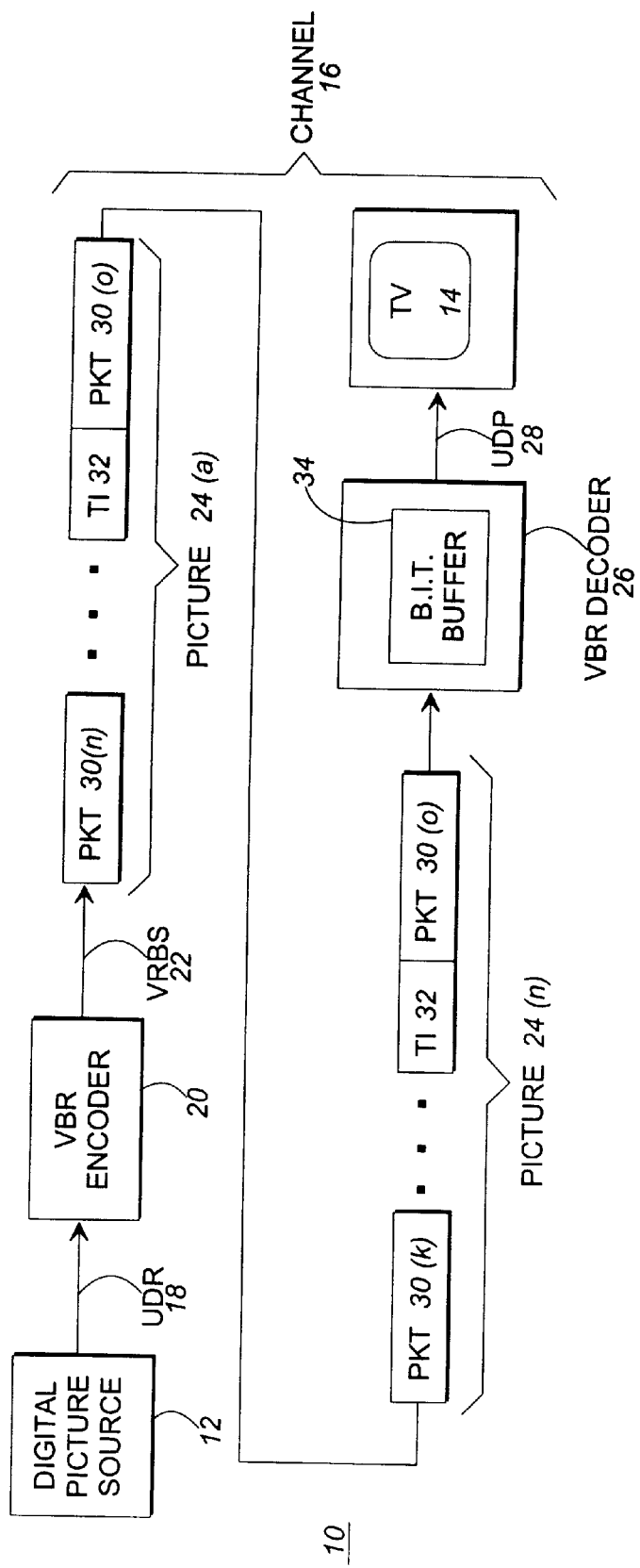
FIG. 1 is a block diagram illustrating how digital television pictures are encoded, transmitted, and decoded.
Figure 2:
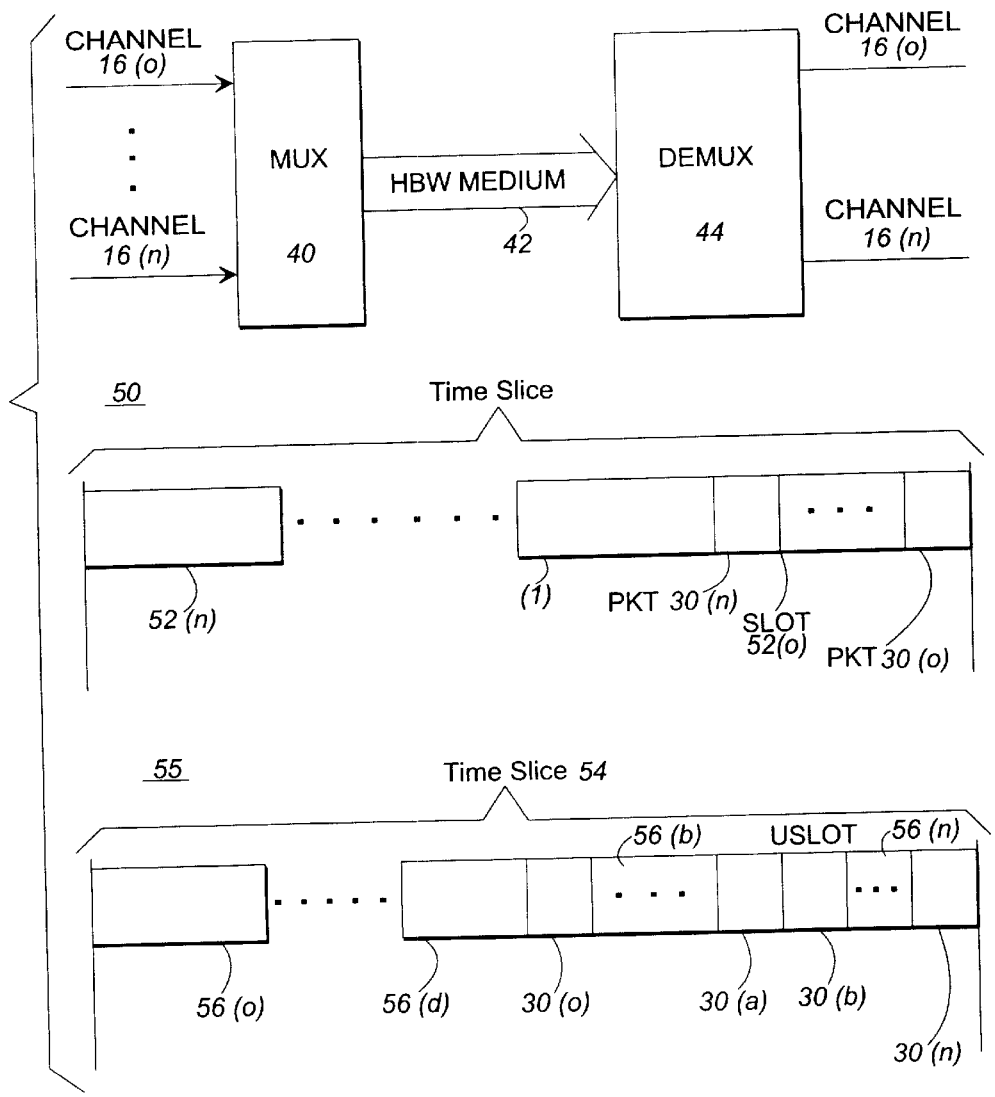
FIG. 2 is a block diagram showing multiplexing of variable-rate bit streams onto a high band width medium.

While the specification concludes with claims defining the features of the invention that are regarded as novel, it is believed that the invention will be better understood from a consideration of the following description in conjunction with the drawing figures, in which like reference numerals are carried forward.

At its simplest, the invention relates to the ability to look ahead to see whether or not the multiplexer system will have sufficient bandwidth to accommodate the video information that will need to be output. The process described hereinbelow looks at the relative space needs per channel and allocates bits (or MPEG packets) as required. By looking at the fullness of the statistical memory buffer (SMB) described in greater detail hereinbelow, panic conditions, i.e., a condition in which bandwidth requirements will exceed bandwidth availability, can be identified. Once identified, such conditions may be avoided.

Figure 3:
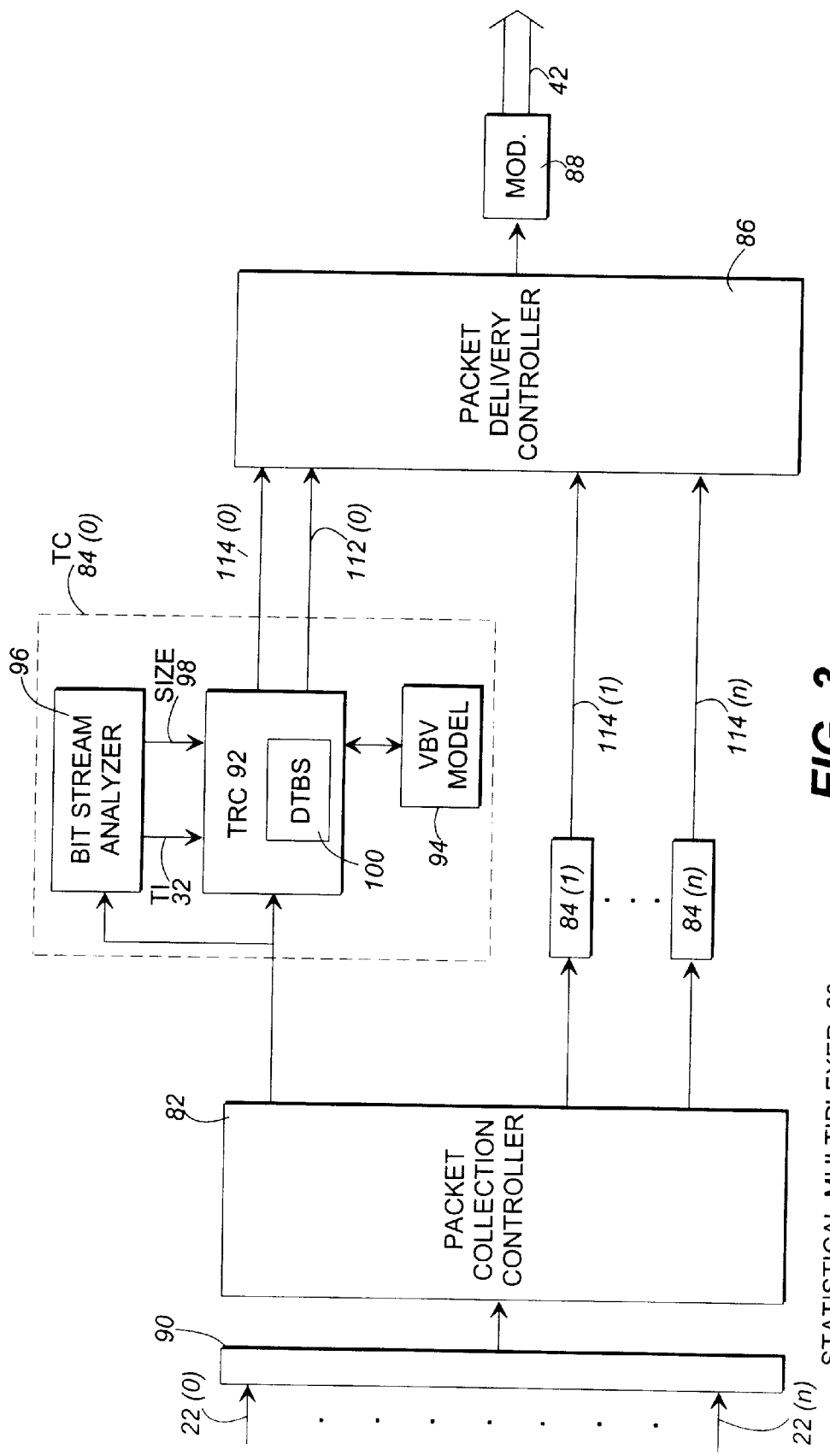
FIG. 3 is a block diagram of a statistical multiplexer which implements a preferred embodiment of the invention.

Referring now to FIG. 3, there is illustrated therein an overview of a statistical multiplexer 80 for MPEG-2 bit streams which is implemented according to the principles of the invention. The main components of multiplexer 80 are packet collection controller 82, a transmission controller ("TC") 84(0) for each variable-rate bit stream 22(0), a packet delivery controller 86, and a modulator 88, which receives the output of packet delivery controller 86 and outputs it in the proper form for transmission medium 42. Packet collection controller 82 collects packets from variable-rate bit streams 22(0 . . . n) and distributes the packets that carry a given bit stream 22(0) to the bit stream's corresponding transmission controller 84(i). In the preferred embodiment, the packets for all of the bit streams 22(0 . . . n) are output to bus 90. Each packet contains an indication of which bit stream it belongs to, and packet collection controller responds to the indication contained in a packet by routing it to the proper transmission controller 84(i). It should be noted here that the packets in each bit stream 22(i) arrive in transmission controller 84(i) in the order in which they were sent by encoder 20(i).

Transmission controller 84 determines the rate at which packets from its corresponding bit stream 22 is output to medium 42. The actual rate determination is made by transmission rate controller ("TRC") 92, which at a minimum, bases its determination on the following information: for at least a current picture in bit stream 22(0), the timing information 32 and the size of the current picture. A Video Buffer Verifier (VBV) model 94, which is a model of a hypothetical bit buffer 34. VBV model 94 uses the timing information and picture size information to determine a range of rates at which bit stream 22 must be provided to the decoder's bit buffer 34 if bit buffer 34 is to neither overflow nor underflow. Transmission rate controller 92 provides the rate information to packet delivery controller 86, which uses the information from all of the transmission controllers 84 (0 . . . n) to determine during each time slice how the bandwidth of transmission medium 42 should be allocated among the bit streams 22 during the next time slice. The more packets a bit stream 22(i) needs to output during a time slice, the more bandwidth it receives for that time slice.

Continuing in more detail, transmission controller 84 obtains the timing and picture size information by means of bit stream analyzer 96, which reads bit stream 22 as it enters transmission controller 84 and recovers the timing information 32 and the picture size 98 from bit stream 22. Bit stream analyzer 96 can do so because the MPEG-2 standard requires that the beginning of each picture 24 be marked and that the timing information 32 occupy predetermined locations in each picture 24. As previously explained, timing information 32 for each picture 24 includes a clock value and a decoding time stamp ("DTS"). Transmission controller 84 and later decoder 26 use the clock value to synchronize themselves with encoder 20. The timing information is found in the header of the Packetized Elementary Stream ("PES") packet that encapsulates the compressed video data. The information is contained in the PTS and DTS time stamp parameters of the PES header. The MPEG-2 standard requires that a time stamp be sent at least every 700 milliseconds (msec). If a DTS is not explicitly sent with a compressed picture, then the decoding time can be determined from parameters in the Sequence and Picture headers, or extrapolated from the DTS value of a previously transmitted picture. For details, see Annex C of ISO/IEC 13818-1. Bit stream analyzer 96 determines the size of a picture simply by counting the bits (or packets) from the beginning of one picture to the beginning of the next picture.

The timing information and the picture size are used in VBV model 94. VBV model 94 requires the timing information and picture size information for each picture in bit stream 22 from the time the picture enters multiplexer 80 until the time the picture is decoded in decoder 26. The DTS buffer 100 must be large enough to hold the timing information for all of the pictures required for the model. It should be noted here that VBV model 94 behavior is defined solely by the semantics of the MPEG-2 standard, not by any concrete bit buffer 34($i$). Any bit buffer for a working MPEG-2 decoder must be able to provide the decoder with the complete next picture at the time indicated by the picture's timing information; that means that the bit buffer 34($i$) for any working MPEG-2 decoder must be at a minimum large enough for the largest possible MPEG-2 picture. Given this minimum buffer size, the timing information for the pictures, and the sizes of the individual pictures, VBV model 94($i$) can determine a rate of output for bit stream 22($i$) which will guarantee for bit buffers 34($i$) of any working MPEG-2 decoder that each picture arrives in the bit buffer 34($i$) before the time it is to be decoded and that there will be no overflow of bit buffer 34($i$).

Figure 4:
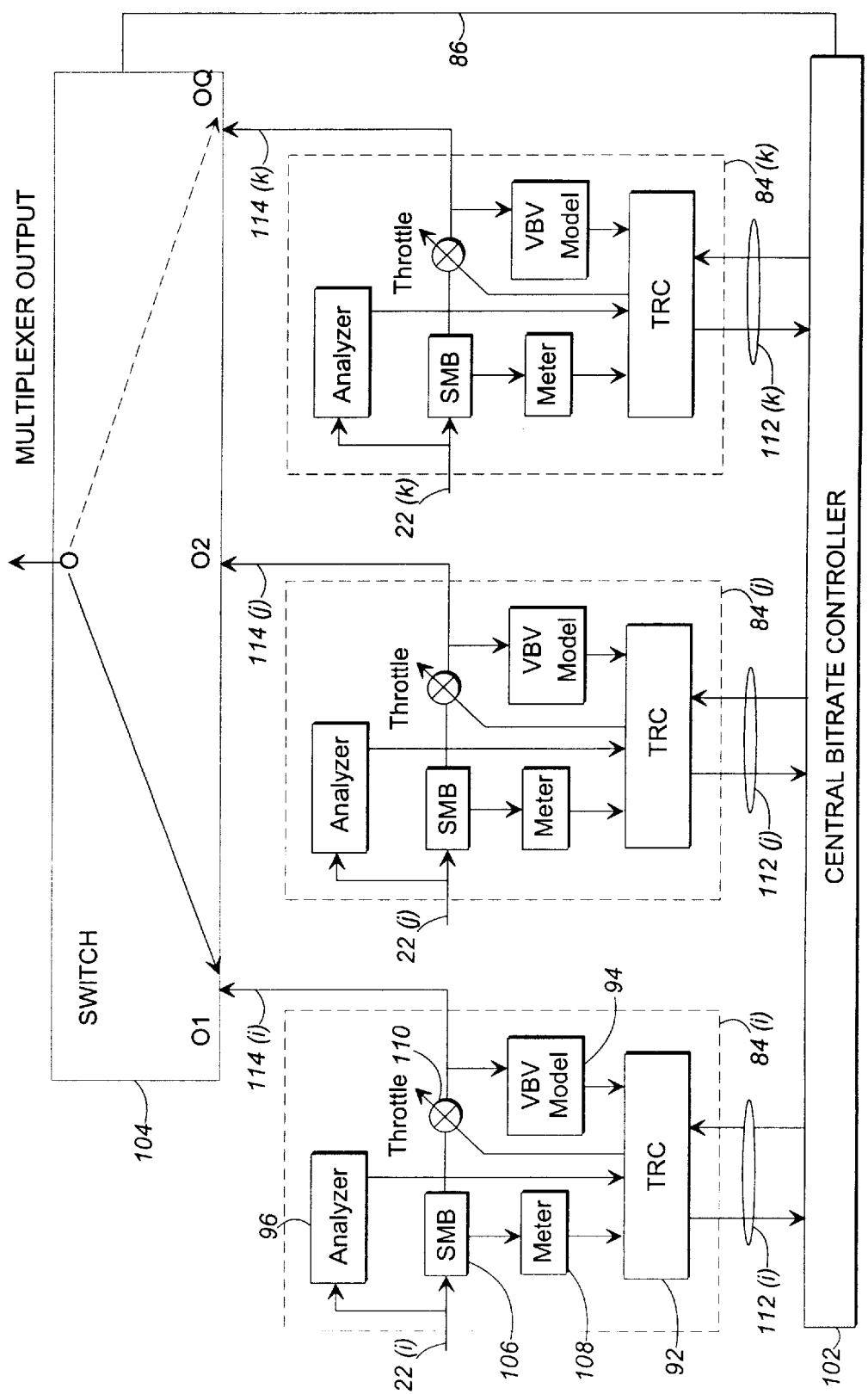
FIG. 4 is a more detailed block diagram of a part of the statistical multiplexer of FIG. 3.

FIG. 4 shows the details of a preferred embodiment of transmission controller 84 and packet delivery controller 86. The figure shows three of the n transmission controllers, namely transmission controllers 84($i$), ($j$), ($k$), and the two major components of packet delivery controller 86, namely central bit rate controller 102 and switch 104. Beginning with transmission controller 84($i$), in addition to transmission rate controller 92, analyzer 96, and VBV model 94, transmission controller includes statistical multiplexer buffer (SMB) 106, a meter 108 for buffer 106, and throttle 110. It is to be noted that while only three transmission controllers (i, j and k) are illustrated, the invention is not so limited. Any number of transmission controllers may be employed. Likewise, as each transmission controller is essentially the same, only one, 84($i$) will be described in detail.

SMB 106 is a first-in-first-out pipe buffer which holds the bits of bit stream 22($i$) while they are in transmission controller 84($i$). In the preferred embodiment, SMB 106 receives pictures 24 (in FIG. 1) in bursts that contain all or almost all of the bits in the picture, depending on the picture size and maximal bit rate specified by the encoder. Such bursts are termed herein picture pulses, and the time period represented by such a picture pulse is denoted as $T_p$, which is the inverse of video frame rate. For example, $T_p=1/29.97=3$ milliseconds (msec) for NTSC video coding. As previously stated, packet delivery controller 86 provides packets in time slices 54. The length of time of one of these slices is denoted herein as $T_c$. In one preferred embodiment, $T_c$ is 10 msec.

SMB 106 must of course be large enough to be able to accept picture pulses of any size during the time it takes to read out the largest expected picture pulse. SMB 106 further must be emptied at a rate that ensures that it cannot overflow, since that would result in the loss of bits from bit stream 22($i$). It also should not underflow, since that would result in the insertion of null packets in the bit stream, resulting in the waste of a portion of the multiplexed medium. Meter 108 monitors the fullness of SMB 106 and provides information concerning the degree of fullness to TRC 92. TRC 92 then uses this information to vary the range of bit rates that it provides to packet delivery controller 86 as required to keep SMB 106 from overflowing or underflowing. Throttle 110, finally, is set by TRC 92 on the basis of information 112($i$) that it has received from packet delivery controller 86 to indicate the number of packets 30 that bit stream 22($i$) is to provide to medium 42 in time slice 54.

In determining the range, TRC 92 sets the minimum rate for a given time slice 54 to the maximum of the rate required to keep SMB 106 from overflowing and the rate required to keep VBV model 94($i$) from underflowing and the maximum rate for the time slice to the minimum of the rate required to keep SMB 106 from underflowing and the rate required to keep VBV model 94 from overflowing. Continuing with packet delivery controller 86, packet delivery controller 86 allocates the packets 30 that can be output during the time slice 54 $T_c$ to bit streams 22(1 . . . $n$) as required to simultaneously satisfy the ranges of rates and priorities provided by TRC 92 for each transmission controller 84 and maximize the number of packets 30 output during time slice 54. In the preferred embodiment, controller 86 has two components, central bit rate controller 102, which is an algorithm which executes on a processor that analyzes the information received from each of the transmission rate controllers 92 in order to determine how many packets from each bit stream are to be output in the next time slice 54, and switch 104, which takes the number of packets 30 permitted by throttle 110 for each bit stream during the time slice 54. Switch 104 is implemented so as to deliver packets from each throttle such that the packets are evenly distributed across time slice 54. Implementing switch in this way reduces the burstiness of the stream of packets to decoder and thereby reduces the amount of transport packet buffer needed in decoder 26. Such implementations of switch 104 are well-known in the art. Accordingly, central bit rate controller 102 executes an algorithm which will be referred to hereinafter as "the bit rate allocation algorithm." The bit rate allocation algorithm is prescribed pursuant to the algorithm described in the commonly assigned U.S. Ser. No. 08/823,007 new U.S. Pat. No. 6,052,384 application incorporated herein by reference. An algorithm which will be referred to hereinafter as "the aggregate panic algorithm" provides additional capability to the bit rate allocation algorithm. Specifically, the capability of detecting when the high bandwidth medium output of the multiplexer is insufficient to deliver the entirety of data (or pictures) buffered in the SMBs of the multiplexer is provided. Additionally, capability to remedy this situation is also provided.

Figure 5:
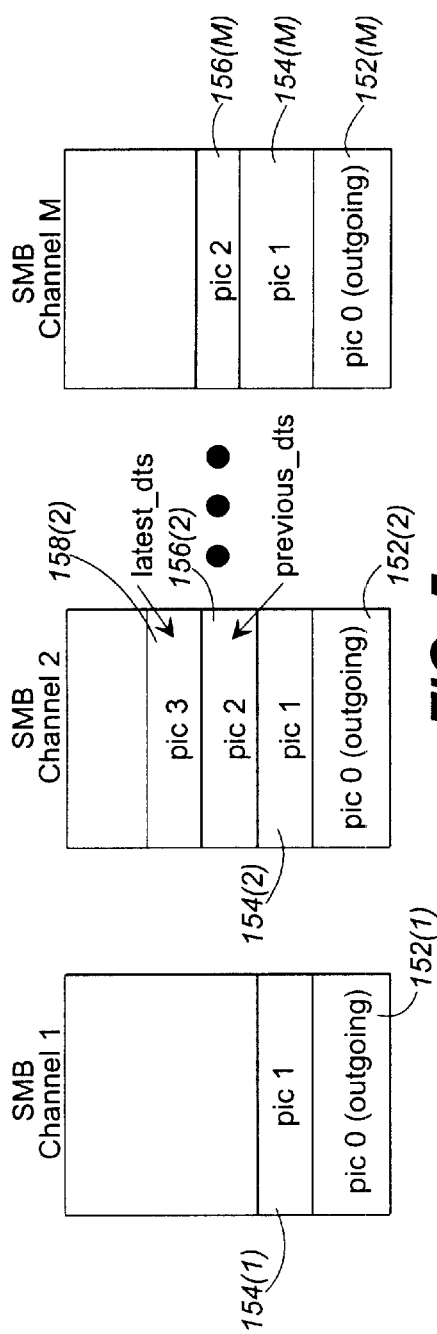
FIG. 5 is a diagram illustrating the identification of an aggregate panic condition in accordance with the instant invention.

Referring now to FIG. 5 there's illustrated therein a diagram illustrating the identification of an aggregate panic condition in accordance with the instant invention. The diagram 150 illustrates essentially a snapshot of the state of all channel SMBs at the start of a particular time slice for the multiplexer illustrated in FIGS. 3 and 4. As may be appreciated, FIG. 5 illustrates 3 channels (channel 1, channel 2, channel M) but the invention is not so limited. Any number of channels may be present. Each SMB of each channel has a currently outgoing picture or picture 0, 152(1), 152(2) and 152($m$), each with a certain number of packets remaining in the picture, followed by the next outgoing picture or picture 1, 154(1), 154(2) and 154($m$) which are themselves followed by the next outgoing pictures represented in FIG. 5 by picture 2 and picture 3 in the SMBs 156(2), 156($m$) and 158(2). It is to be understood that each SMB may have a different amount or number of pictures buffered in the SMBs themselves, as is illustrated in FIG. 5.

Since the algorithm requires processing time on a processing unit, the results of the bit-rate allocation algorithm must be applied to a future time slice. That is, there is processing delay from when the bit-rate allocation algorithm begins execution to when the results may be applied. This delay, which is a fixed delay, will be denoted in terms of the number of time slices ahead and identified by the term "N_TC_AHEAD." N_TC AHEAD is the number of time slices processing delay of the bit-rate allocation algorithm of a variable rate multiplexer. In one embodiment, N_TC_AHEAD is one or two time slices ahead so that the processing delay is at most, two time slices.

When the bit-rate allocation algorithm begins execution of a particular time slice, the algorithm must adjust its knowledge of the contents of all SMBs to create a snapshot of the SMBs for N_TC_AHEAD time slices ahead of the current time. Thus, if "time_now" represents the current system time at which the bit rate allocation algorithm begins executing, the bit-rate allocation algorithm adjusts its knowledge of the SMBs to a snapshot at time:

time_now+N_TC_AHEAD*$T_c$

Returning to FIG. 5, the aggregate panic method algorithm of the instant invention may execute each and every time slice, and operates on the same snapshot of all the channel SMBs as does the bit-rate allocation algorithm. This implies a snapshot at system time equal to time_now+N_TC AHEAD*$T_c$ where time_now is the system time at the beginning of the time slice when the aggregate panic algorithm is initiated. The aggregate panic method computes the number of packets "num_packets" buffered in the entire variable rate multiplexer by summing over all m channels the number of packets in the associated channels SMB:

num_packets=; $P_i(1 \leq i \leq M)$ where i is the channel index, $P_i$ is equal to the total number of transport packets in $SMB_i$ and $SMB_i$ is the SMB corresponding to channel "i." Next, the latest decoding time stamp ("DTS") hereinafter referred to as latest_DTS of all pictures of all SMBs is determined. The picture with the latest DTS can be viewed as the last picture to leave the variable rate multiplexer of the entirety of pictures that are then currently stored in the multiplexer. The previous_DTS is the DTS of the immediately preceding picture of the picture with the latest_DTS, both of which are illustrated in FIG. 5 by pictures 156(2) and 158(2) which are the previous_DTS and latest_DTS respectively. Determining latest_DTS in this fashion (e.g., by simply comparing DTSs of all pictures in the SMBs) requires that all channel bit streams be on the same system time base. This further implies that all encoders inputting data to the variable rate multiplexer are locked to the same system clock. This system clock is designated the system clock reference ("SCR"), and when all encoders are locked to the same SCR, the DTS of all the channel bit streams will be referenced to the same clock. This therefore is one way that it is possible to determine the latest picture by inspecting the DTS only. Conversely, if all encoders are not locked to the same SCR, then the latest picture would be given by the following formula:

latest_DTS=DTS of picture j for channel i which maximizes (DTS(i,j)−SCR(i))

where i is the channel index which ranges from ($1 \leq i \leq m$) for m channels, and j ranges from ($0 \leq j \leq$ number of entire pictures in SMB (i)), and picture j is the jth outgoing picture for channel i. In this case, the latest picture is that picture, the DTS value of which minus the SCR of the associated channel is greatest.

In the known art of the variable rate multiplexer, each picture must arrive at the decoder by the system time given by the DTS of the immediately proceeding picture. This will guarantee that there is at least one picture in the decoder at all times since it guarantees that by the time the picture is decoded, the next picture will have arrived at the decoder. Thus, the entirety of data in the variable rate multiplexer must be transmitted out of the multiplexer in an amount of time given by −t which is itself expressed by:

−t=previous_DTS−(time_now+N_TC_AHEAD*$T_c$)

where, time_now is the current system time (or current value of the SCR) and $T_c$ is the time period of the time slice of the bit-rate allocation algorithm (e.g. 10 msec). Since it is required that num_packets be transmitted from the multiplexer in an amount of time given by −t, it is possible to determine whether or not the multiplexer has sufficient bandwidth to achieve this by comparing num_packets with the maximum number of packets which the multiplexer can transmit in this amount of time. The maximum number of packets that the multiplexer can transmit in −t will be referred to hereinafter as num_packets_max and is computed as follows:

$$\text{num\_packets\_max} = Rmux * -t/\text{TP\_size}$$
$$= (Rmux * T_c * -t)/(\text{TP\_size} * T_c)$$
$$= (Rmux * T_c / \text{TP\_size}) * (-t/T_c)$$
$$= \text{Np\_tc} * -t/Tc$$

Where Rmux is equal to the output bandwidth of the multiplexer in bits per second (a constant), TP_SIZE is the number of bits in a transport packet, Np_tc is equal to the number of packets which the multiplexer can transmit over a time slice, and $T_c$ is equal to the period in the time slice.

An aggregate panic condition therefore exists if num_packets is greater than num_packets_max. In this event, the total number of packets buffered in the entire multiplexer cannot possibly be transmitted in a timely enough manner such that the last picture arrives at its respective decoder by the DTS of the immediately preceding picture. The output bandwidth of the multiplexer is insufficient to guarantee this. To remedy this situation, non-anchor pictures are replaced with smaller glue pictures. As is readily understood in the art, a glue picture is a prestored minimally coded picture, with no discrete cosine transform ("DCT") coefficients and a 0 motion vector so that they are essentially repeat pictures. Beginning with the lowest priority channel, all non-anchor pictures buffered in that channel's SMB are replaced with glue pictures. For each picture replaced by a glue picture, num_packets will need to be adjusted to account for the fact that there is a smaller picture in one of the SMBs of the multiplexer. Therefore, for each glue frame insertion, num_packets will be adjusted as follows:

k_packets_saved=p(i,j)−g_packets num_packets=num_packets−k_packets_saved where, p(i,j) is equal to the number of packets in outgoing picture number j for channel i, and the range of j is ($1 \leq j \leq$ number of full pictures in $SMB_i$), the range of i is ($1 \leq i \leq M$) for M channels, g_packets is the number of packets in the prestored glue picture (a constant, which, in the preferred embodiment, is equal to two for standard resolution digital video) and k_packets_saved is equal to the number of packets difference between the original non-anchor picture and the glue picture.

This process continues for each channel, where glue pictures replace the non-anchor pictures and the num_packets is recomputed until num_packets becomes $\leq$ num_packets_max. When this occurs, the aggregate panic condition has been removed and therefore the bandwidth of the multiplexer should be sufficient to transmit the entirety of all packets in the multiplexer by the time required for the final picture. Accordingly, when num_packets has been adjusted to the point that num_packets is≦num_packets_max, the aggregate panic algorithm is completed and no additional glue pictures are inserted.

Figure 6:
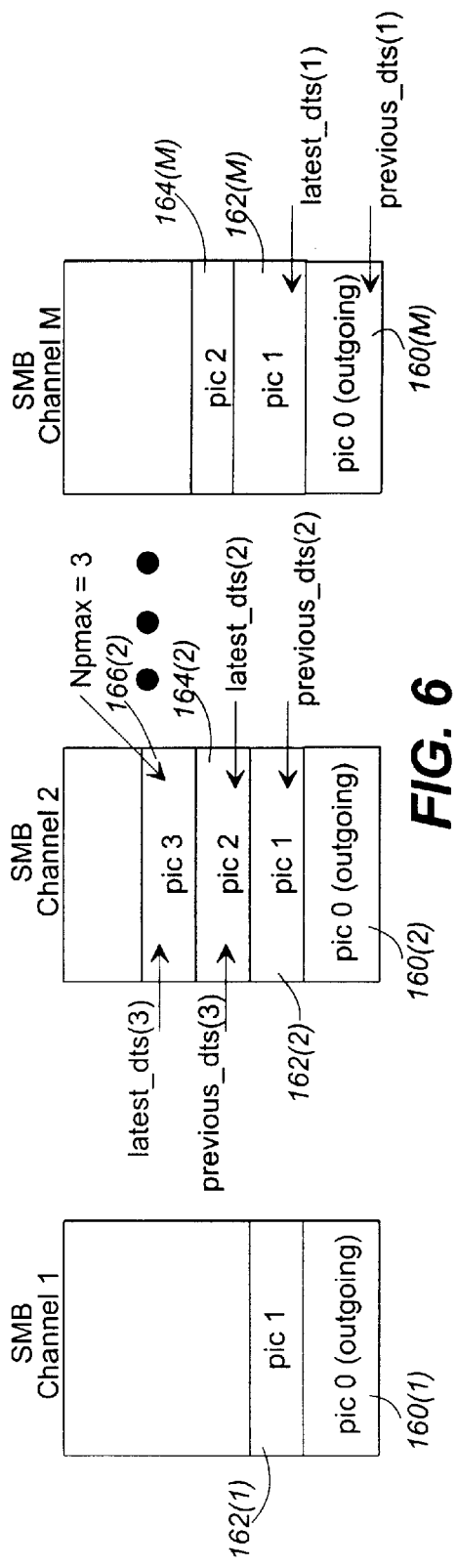
FIG. 6 is a diagram illustrating the aggregate panic condition in greater detail in accordance with the instant invention.

Referring now to FIG. 6 there is illustrated therein a diagram of an aggregate panic condition in greater detail, in accordance with the instant invention. In particular, the method illustrated with respect to FIG. 5 hereinabove examines the entirety of the data in the multiplexer, and uses the DTS of the latest picture of that entirety of data to determine whether or not there exists sufficient bandwidth to transmit the entirety of data from the multiplexer. As is illustrated in FIG. 6 and will be described in greater detail hereinbelow, this method may be extended to analyze the entirety of data up to outgoing picture "k" where k will vary from 1 to number of pictures in the SMB with the largest number of pictures. FIG. 6 illustrates the pictures buffered in the SMBs for channels 1, 2, . . . m. Each channel has a currently outgoing picture 160(1), 160(2), 160(m), which is outgoing picture 0, and the next outgoing picture immediately following picture 0 is referred to as picture 1, 162(1), 162(2) 162(m), which are followed by additional pictures in each SMB as illustrated. Each of the SMBs may have a different number of pictures buffered as is illustrated in FIG. 6, where SMB 2 and SMB m include picture 2, 164(2) and 164(m) respectively, and SMB 2 further includes picture 3, 166. Note that each currently outgoing picture in all of the SMBs, (or each of the pictures 0) may or may not be an entire picture, since part of the outgoing picture has already been transmitted from multiplexer.

Referring to picture 1, 162(1), 162(2), 162(m), the term latest_DTS(1) is defined as the latest DTS of all picture 1s of all SMBs. Similarly, the term previous_DTS(1) will be understood to be the DTS of the immediately preceding picture with latest DTS(1). Num_packets(1) is the total number of packets in all SMBs up to picture 1. This includes all packets in the currently outgoing pictures of all SMBs and all packets in the next outgoing pictures. Num_packets (1) must be transmitted from the multiplexer in an amount of time given by −t(1) where:

−t(1)=previous_DTS(1)−(time_now+$N\_TC\_AHEAD*T_c$)

The maximum number of packets which can be transmitted from the multiplexer in this amount of time is given similarly as above in which:

num_packets_max(1)=$Np\_tc*-t(1)/T_c$ if num_packets(1) is≦num_packets_max(1), this implies that the output bandwidth of the multiplexer is sufficient to transmit the entirety of all picture is from the multiplexer in time for the latest picture to arrive by the DTS of the immediately proceeding picture. In this case, there is no aggregate panic condition for picture 1, and the method described herein moves on to the next picture, all as described hereinbelow.

An aggregate panic condition exists for picture 1 if num_packets(1) is greater than num_packets_max(1). In this event, the bandwidth of the multiplexer is not sufficient to transmit the entirety of data up to picture 1 to guarantee the latest picture of all picture 1s will be transmitted to its respective decoder by the DTS of the immediately preceding picture. To remedy this situation, non-anchor pictures are replaced by smaller glue pictures, until this condition is removed.

Accordingly, beginning with the lowest priority channel, if picture 1 is a non-anchor picture, it is replaced by a glue picture as described above. Then, num_packets(1) is adjusted according to the following formula:

k_packets_saved=p($i$,1)−g_packets num_packets(1)=num_packets(1)−k_packets_saved where p(i, 1) is equal to the number of packets in outgoing picture 1 for channel i, where i is the channel index which increments from lowest priority to highest priority channel, and range for i is (1≦i≦m) for m channels, and k_packets_saved and g_packets are defined as set forth hereinabove.

The process of glue frame insertion continues until all channel picture 1s have been examined for glue frame insertion opportunities or num_packet(1) has been adjusted to the point where it is less than num packet_max(1). When num_packets(1) is≦num_packets_max(1), this means that the bandwidth of the mux is sufficient to transmit the entirety of data for all picture 1s of all SMBs in a timely manner as set forth hereinabove.

After picture 1 has been processed as discussed hereinabove, the aggregate panic method moves on to picture 2 and performs an identical computation. The algorithm then moves from picture to picture in order to identify those situations in which a panic condition exists, dealing with each subsequently occurring panic condition as described hereinabove with respect to picture 1. The algorithm continues iterating up to outgoing picture $N_p$max where $N_p$max is the number of pictures in the SMB having the greatest number of pictures, illustrated in FIG. 6 as picture 166. Typically, the algorithms described hereinabove with respect to FIGS. 5 and 6 have performed each and every time slice, since in general, each of the SMBs will have received new data in each time slice.

In order to more easily understand the invention, it is necessary to understand that there is a correlation between SMB fullness and the likelihood of a panic condition existing. As is described hereinabove, panic condition exists when the number of packets to be outputted from the multiplexer exceeds the bandwidth available to the multiplexer for a given time slice. The methods described hereinabove with respect to FIGS. 5 and 6 look at the fullness of the SMBs and from this measure of fullness, is able to detect up to 90% of the panic conditions which are likely to occur. For the additional 10% of panic conditions, a more refined method such as that described in commonly assigned application Ser. No. 08/823,007, now U.S. Pat. No. 6,052,384 the disclosure of which is incorporated herein by reference, may be employed.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for identifying an imminent bandwidth overflow condition in a multiplexer, said multiplexer including a plurality of memory buffers for receiving incoming pictures from a source, and for outputting said pictures, said pictures comprising a plurality of packets, said method comprising the steps of:

determining a total number of packets in said memory buffers for a given time period; and comparing a number of packets necessary to be output for a given time period to a number of packets which said multiplexer is capable of outputting during said time period, and based on such comparison, determining if a bandwidth overflow condition exists;

whereby said bandwidth overflow condition may be eliminated by replacing a portion of the bit stream with a glue frame; and whereby a glue frame opportunity is selected from at least one of a plurality of channels of information said channels being evaluated on a lowest to highest priority basis to identify said glue frame opportunities.

2. The method set forth in claim 1, wherein said pictures arrive in a bit stream, said bit stream is a sequence of components having a total size, the components having varying lengths and each component including timing information indicating when a receiver must process the component, including the further steps of;

determining an output rate for a given period of time and comprises the steps of determining a minimum rate such that the component is output from one of said memory buffers before the receiver must process the component; and determining a maximum rate such that the total size of the components in the set of the components that have been sent to but not yet processed by the receiver does not exceed the size of a bit buffer in the receiver.

3. The method set forth in claim 1, wherein the pictures are digitally-encoded video images.

4. The method set forth in claim 3, wherein the pictures are encoded according to the MPEG-2 standard.

5. A method as in claim 1, wherein the bandwidth is defined by the size of the memory buffer and a video buffer in said receiver.

6. A method as in claim 1, wherein the step of comparing comprises the further step of comparing bandwidth output requisites versus bandwidth capability for a plurality of future time slices.

7. A method as in claim 1, including the further step of dropping channels if no glue frame opportunities are identified.

8. A method as in claim 7, wherein channels are dropped in lowest to highest priority order.

9. A method as in claim 1, wherein said time period comprises the time period for the next outgoing pictures from said memory buffer.

10. A method as in claim 1, wherein said time period comprises the time period for all pictures in said memory buffer.

11. A method for identifying an imminent bandwidth overflow condition in a multiplexer, said multiplexer including a plurality of memory buffers for receiving incoming pictures from a source, and for outputting said pictures, said pictures comprising a plurality of packets, said method comprising the steps of:

determining a total number of packets in said memory buffers for a set of pictures comprising next outgoing pictures in said memory buffers;

comparing a number of packets necessary to be output for said set of pictures to a number of packets which said multiplexer is capable of outputting; and reallocating packets so that bandwidth output requirements for said set of pictures is less than or equal to bandwidth capability for said multiplexer;

whereby said bandwidth overflow condition may be eliminated by replacing a portion of the bit stream with a glue frame; and whereby said portion replaced by a glue frame is selected from at least one of a plurality of channels of information having a glue frame opportunity.

12. The method set forth in claim 11, wherein said pictures arrive in a bit stream, said bit stream is a sequence of components having a total size, the components having varying lengths and each component including timing information indicating when a receiver must process the component, including the further steps of;

determining an output rate for a given period of time and comprises the steps of determining a minimum rate such that the component is output from one of said memory buffers before the receiver must process the component; and determining a maximum rate such that the total size of the components in the set of the components that have been sent to but not yet processed by the receiver does not exceed the size of a bit buffer in the receiver.

13. The method set forth in claim 11, wherein the pictures are digitally-encoded video images.

14. The method set forth in claim 11, wherein the pictures are encoded according to the MPEG-2 standard.

15. A method as in claim 11, wherein the bandwidth is defined by the size of the memory buffer and a video buffer in said receiver.

16. A method as in claim 11, wherein the step of comparing comprises the further step of comparing multiplexer bandwidth output versus capability for a plurality of future time slices.

17. A method as in claim 11, including the further step of dropping channels if no glue frame opportunities are identified.

18. A method as in claim 17, wherein channels are dropped in lowest to highest priority order.

* * * * *

UNITED STATES PATENT AND TRADEMARK OFFICE
CERTIFICATE OF CORRECTION

PATENT NO. : 6,418,122 B1
DATED : July 9, 2002
INVENTOR(S) : Schoenblum et al.

It is certified that error appears in the above-identified patent and that said Letters Patent is hereby corrected as shown below:

<u>Column 8,</u>
Line 33, delete "08/823,007 new" and insert therefore -- 08,823,007, now --

<u>Column 9,</u>
Line 20, delete "TC AHEAD*$T_c$" and insert therefore -- TC_AHEAD*$T_c$ --

Signed and Sealed this

Third Day of December, 2002

JAMES E. ROGAN
*Director of the United States Patent and Trademark Office*